United States Patent
Dobre

(10) Patent No.: US 9,652,302 B2
(45) Date of Patent: May 16, 2017

(54) METHOD FOR BUILDING A RANKED REGISTER AND A COMPARE-AND-SWAP OBJECT, A RANKED REGISTER AND COMPARE-AND-SWAP-OBJECTS

(71) Applicant: NEC EUROPE LTD., Heidelberg (DE)

(72) Inventor: Dan Dobre, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 103 days.

(21) Appl. No.: 14/432,781

(22) PCT Filed: Oct. 15, 2013

(86) PCT No.: PCT/EP2013/071489
§ 371 (c)(1),
(2) Date: Apr. 1, 2015

(87) PCT Pub. No.: WO2014/060393
PCT Pub. Date: Apr. 24, 2014

(65) Prior Publication Data
US 2015/0269007 A1    Sep. 24, 2015

(30) Foreign Application Priority Data
Oct. 15, 2012  (EP) .................................... 12188516

(51) Int. Cl.
G06F 12/00   (2006.01)
G06F 9/52    (2006.01)
G06F 9/30    (2006.01)

(52) U.S. Cl.
CPC .......... *G06F 9/526* (2013.01); *G06F 9/30021* (2013.01); *G06F 9/30087* (2013.01)

(58) Field of Classification Search
CPC ... G06F 9/526; G06F 9/30021; G06F 9/30067
See application file for complete search history.

(56) References Cited

U.S. PATENT DOCUMENTS

2012/0017037 A1* 1/2012 Riddle .............. G06F 17/30519
711/103

OTHER PUBLICATIONS

Gregory Chockler et al: "Active Disk Paxos with infinitely many processes", Distributed Computing, Springer, Berlin, DE; vol. 18, No. 1, Jul. 1, 2005, pp. 73-84, XP019347301.
Gregory Chockler et al: "Active disk paxos with infinitely many processes", Proceedings of the twenty-first annual symposium on principles of distributed computing, Jul. 21, 2002, pp. 78-87, XP55099740.

* cited by examiner

*Primary Examiner* — Matthew Bradley
(74) *Attorney, Agent, or Firm* — Leydig, Voit & Mayer, Ltd.

(57) ABSTRACT

A method is used to build a concurrent data structure in the form of a ranked register based on a Compare-And-Swap (CAS) functionality and an according ranked register, to allow reliable access of shared data within a storage by multiple clients. Read and write operations are defined within the ranked register. The read operation takes a rank as argument and returns a rank-value pair. The write operation takes a rank-value pair as argument and returns either commit or abort. The read operation returns a rank-value pair that was written in a previous write operation.

19 Claims, 4 Drawing Sheets

```
1:  Definitions
2:    RVals: (Ranks × Vals) ∪ {(r₀, ⊥)} with selectors rank and val
3:  Base-objects
4:    x ∈ RVals is a ranked register, initially (r₀, ⊥)
5:  State
6:    r: Ranks initially r₀
7:    old: Vals initially ⊥

8:  operation CAS(exp, new)            20:  operation READ()
9:    while true do                    21:    v ← CAS(⊥, ⊥)
10:     r ← chooseRank(r)              22:    return v
11:     V ← x.rr-read(r)
12:     old ← V.val
13:     if V.val = exp then
14:       V.val ← new
15:     V.rank ← r
16:     if x.rr-write(V) = commit then
17:       return old
18:     else
19:       wait(a_while)  //exp.back-off
```

1: Definitions
2:     *RVals*: (*Ranks* × *Vals*) ∪ {($r_0$, ⊥)} with selectors *rank* and *val*
3: Base-objects
4:     $x \in$ *RVals* is a ranked register, initially ($r_0$, ⊥)
5: State
6:     $r$: *Ranks* initially $r_0$
7:     *old*: *Vals* initially ⊥

---

8: operation *CAS*(*exp*, *new*)
9:     while true do
10:         $r \leftarrow$ *chooseRank*($r$)
11:         $V \leftarrow$ *x.rr-read*($r$)
12:         *old* $\leftarrow$ *V.val*
13:         if *V.val* = *exp* then
14:             *V.val* $\leftarrow$ *new*
15:         *V.rank* $\leftarrow$ $r$
16:         if *x.rr-write*(*V*) = *commit* then
17:             return *old*
18:         else
19:             *wait*(a_while) //exp.back-off 20: operation *READ*()
21:     $v \leftarrow CAS(\bot, \bot)$
22:     return $v$

Fig. 3

1: Definitions
2:    $X$: $(Ranks \times Ranks \times Vals) \cup \{v_0\}$ with selectors $rR$ and $wR$ and $val$
3:    $v_0 : (r_0, r_0, \bot)$
4: Base-objects
5:    $\forall i \in S, x_i \in X$ is a base-object on storage-node $i$, initially $v_0$
6: State
7:    $x[k]$: $X$, for every $k \in S$, initially $v_0$
8:    $new$: $X$, initially $v_0$
9:    $retval$: { $abort, commit$ }, initially $commit$
10:    $R : 2^{\mathbb{N}_0}$, initially $\emptyset$ 11: operation $rr\text{-}write((r, v))$
12:    $new.wR \leftarrow r$
13:    $new.val \leftarrow v$
14:    in parallel for all $k \in S$ do
15:       invoke $x_k.CAS_w(v_0, new)$
16:    wait until $|R| \geq \lceil(|S|+1)/2\rceil$
17:    return $retval$
18: operation $rr\text{-}read(r)$
19:    $new.rR \leftarrow r$
20:    in parallel for all $k \in S$ do
21:       invoke $x_k.CAS_r(v_0, new)$
22:    wait until $|R| \geq \lceil(|S|+1)/2\rceil$
23:    $k \leftarrow \text{ARGMAX}_{k \in R}\{x[k].wR\}$
24:    return $(x[k].wR, x[k].val)$ 25: upon completion $x_k.CAS_w(u, *)$ returning $v$
26:    if $u \neq v \land r \geq v.rR \land r > v.wR$ then
27:       $new.rR \leftarrow v.rR$
28:       invoke $x_k.CAS_w(v, new)$
29:    else
30:       $R \leftarrow R \cup \{k\}$
31:       if $u \neq v$ then
32:          $retval \leftarrow abort$
33: upon completion $x_k.CAS_r(u, *)$ returning $v$
34:    $x[k] \leftarrow v$
35:    if $u \neq v \land r > v.rR \land r > v.wR$ then
36:       $x[k].rR \leftarrow r$
37:       invoke $x_k.CAS_r(v, x[k])$
38:    else $R \leftarrow R \cup \{k\}$

Fig. 4

METHOD FOR BUILDING A RANKED REGISTER AND A COMPARE-AND-SWAP OBJECT, A RANKED REGISTER AND COMPARE-AND-SWAP-OBJECTS

CROSS-REFERENCE TO PRIOR APPLICATIONS

This application is a U.S. National Phase application under 35 U.S.C. §371 of International Application No. PCT/EP2013/071489, filed on Oct. 15, 2013, and claims priority to European Patent Application No. EP 12188516.4, filed Oct. 15, 2012. The International Application was published in English on Apr. 24, 2014 as WO 2014/060393 under PCT Article 21(2).

FIELD

The present invention relates to a method for building a concurrent data structure in the form of a ranked register and a compare-and-swap object for data transactions in distributed data storage.

The present invention further relates to a ranked register and a compare-and-swap object built for a concurrent data structure for data transactions in distributed data storage.

BACKGROUND

Thanks to the advent of cloud services, distributed databases have benefited from deployments spanning a cluster of machines within a single cloud. In such a setting, replication is the advocated solution to achieve data scalability and fault-tolerant durability. However, entire clouds may fail, rendering critical data unavailable, which ultimately leads to revenue losses.

With embodiments of this invention, the following problem is addressed: How can multiple storage clouds or servers be leveraged to enable transactional access to shared data among a large, possibly unbounded, number of clients despite crashes, asynchrony and concurrency?

An increasing number of data serving platform providers such as Amazon and Yahoo! have recognized the need for transactional access to shared data in addition to atomic read/write. It is possible to construct strong coordination primitives enabling transactional access just from atomic read/write operations. However, it is known that such constructions do not scale since the space- and communication overhead is proportional in the number of clients. Furthermore, leaving it to the developer to directly deal with the intricacies of implementing strong data-sharing primitives, such as read-modify-write, from weaker ones may result in inefficient and/or error-prone implementations.

As a consequence a number of data serving platforms such as DynamoDB, PNUTS and cloud data-bases such as Couchbase, MongoDB, Redis etc. have started including in their APIs coordination abstractions stronger than read/write. The most powerful among such primitives is Compare-And-Swap, CAS, for it enables implementing any shared functionality in a non-blocking manner, i.e. without using locks.

Intuitively, CAS updates a storage location only if the current value of that location is as expected, where the expected value is supplied to CAS along with the new value. Typically, CAS is used for optimistic concurrency control as follows: (1) a storage location x is read into a local variable v, then (2) based on the value of v some local computation is done that changes v and then (3) x is updated with v via CAS. If x didn't change, then x takes the new value v. Else x remains unchanged. In that case steps (1)-(3) are repeated. Used this way, CAS enables transactional access to shared data.

For example, Gregory Chockler and Dahlia Malkhi. 2002, "Active disk paxos with infinitely many processes", In Proceedings of the twenty-first annual symposium on Principles of distributed computing (PODC '02) (herein "[PODC02]") illustrate the above data transaction.

SUMMARY

A method is used to build a concurrent data structure in the form of a ranked register based on a Compare-And-Swap (CAS) functionality and an according ranked register, to allow reliable access of shared data within a storage by multiple clients. A read and write operations are defined within the ranked register. The read operation takes a rank as argument and returns a rank-value pair. The write operation takes a rank-value pair as argument and returns either commit or abort. The read operation returns a rank-value pair that was written in a previous write operation.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3 illustrates the construction of an obstruction-free CAS object from a ranked register according to (a) of FIG. 2, according to an embodiment.

FIG. 4 illustrates the construction of a fault-tolerant ranked register from fault-prone CAS objects according to (b) of FIG. 2, according to an embodiment.

DETAILED DESCRIPTION

Figure 1:
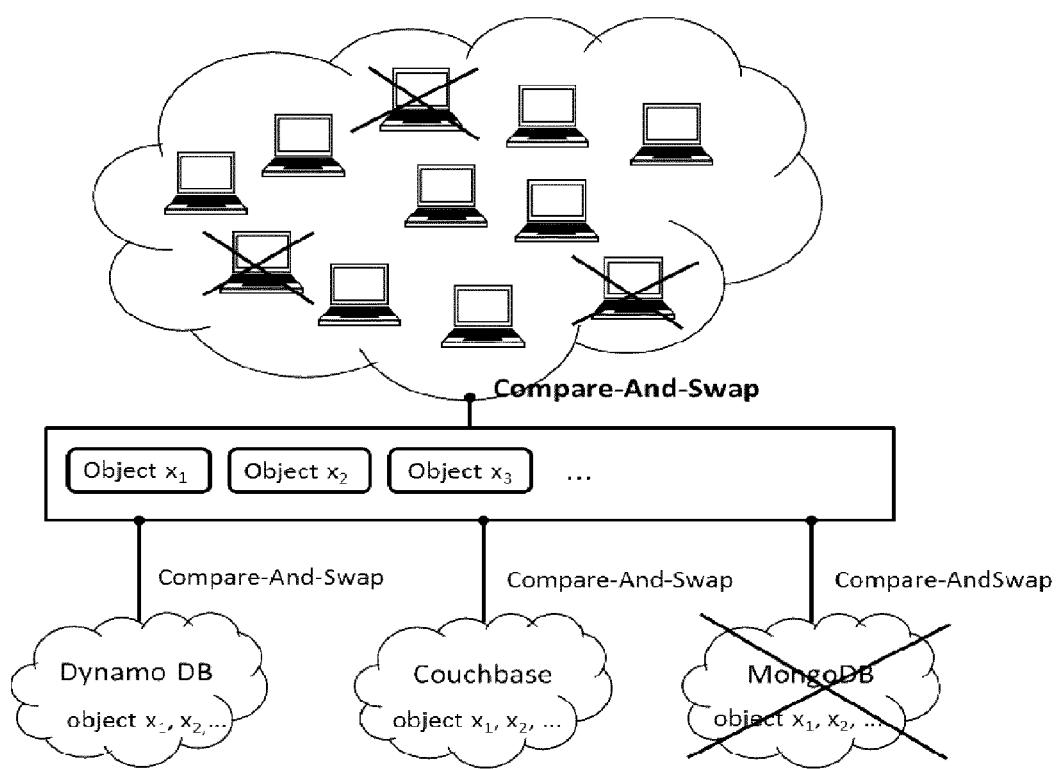
FIG. 1 illustrates a system with examples of cloud/NoSQL data-bases offering CAS API, according to an embodiment.

In an embodiment, the present invention relates to a method for building a concurrent data structure in the form of a ranked register, RR, wherein within the RR two operations rr-read and rr-write are defined, wherein the rr-read operation is provided for taking a rank as argument and for returning a rank-value pair, wherein the rr-write operation is provided for taking a rank-value pair as argument and for returning either commit or abort and wherein the RR satisfies the following specification:

Safety: Every rr-read operation returns a rank-value pair that was written in some rr-write invocation; additionally, let W=rr-write($r\_1$, v) be a rr-write operation that commits and let R=rr-read($r\_2$), such that $r\_2 > r\_1$; then R returns (r',v') where $r' >= r\_1$ (R sees W), wherein v and v' are values and wherein r', $r\_2$ and $r\_1$ are ranks, Non-triviality: If a rr-write operation W invoked with rank $r\_1$ aborts, then there exists a rr-read or rr-write operation with rank $r\_2 > r\_1$ which is invoked before W returns, and Liveness: If an operation rr-read or rr-write is invoked by a non-faulty process, then it eventually returns.

In an embodiment, the present invention also relates to a concurrent data structure in the form of a ranked register, RR, preferably built by the method according to any one of claims 1 to 6, wherein within the RR two operations rr-read and rr-write are defined, wherein the rr-read operation is provided for taking a rank as argument and for returning a rank-value pair, wherein the rr-write operation is provided for taking a rank-value pair as argument and for returning either commit or abort and wherein the RR satisfies the following specification:

Safety: Every rr-read operation returns a rank-value pair that was written in some rr-write invocation; additionally, let W=rr-write($r\_1$, v) be a rr-write operation that commits and let R=rr-read($r\_2$), such that $r\_2 > r\_1$; then R returns (r',v') where $r' >= r\_1$ (R sees W), wherein v and v' are values and wherein r', $r\_2$ and $r\_1$ are ranks, Non-triviality: If a rr-write operation W invoked with rank $r\_1$ aborts, then there exists a rr-read or rr-write operation with rank $r\_2 > r\_1$ which is invoked before W returns, and Liveness: If an operation rr-read or rr-write is invoked by a non-faulty process, then it eventually returns.

In an embodiment, the present invention further relates to a method for building a Compare-And-Swap, CAS, object, wherein a concurrent data structure in the form of a ranked register, RR, is used, wherein within the RR two operations rr-read and rr-write are defined, wherein the rr-read operation is provided for taking a rank as argument and for returning a rank-value pair, wherein the rr-write operation is provided for taking a rank-value pair as argument and for returning either commit or abort and wherein the RR satisfies the following specification:

Safety: Every rr-read operation returns a rank-value pair that was written in some rr-write invocation; additionally, let W=rr-write($r\_1$, v) be a rr-write operation that commits and let R=rr-read($r\_2$), such that $r\_2 > r\_1$; then R returns (r',v') where $r' >= r\_1$ (R sees W), wherein v and v' are values and wherein r', $r\_2$ and $r\_1$ are ranks, Non-triviality: If a rr-write operation W invoked with rank $r\_1$ aborts, then there exists a rr-read or rr-write operation with rank $r\_2 > r\_1$ which is invoked before W returns, and Liveness: If an operation rr-read or rr-write is invoked by a non-faulty process, then it eventually returns, wherein increasing versions of values within data objects are stored for ensuring that newer values are never overwritten with older ones.

In an embodiment, the present invention even further relates to a Compare-And-Swap, CAS, object, preferably built by the method according to any one of claims 8 to 14, based on a concurrent data structure in the form of a ranked register, RR, wherein within the RR two operations rr-read and rr-write are defined, wherein the rr-read operation is provided for taking a rank as argument and for returning a rank-value pair, wherein the rr-write operation is provided for taking a rank-value pair as argument and for returning either commit or abort and wherein the RR satisfies the following specification:

Safety: Every rr-read operation returns a rank-value pair that was written in some rr-write invocation; additionally, let W=rr-write($r\_1$, v) be a rr-write operation that commits and let R=rr-read($r\_2$), such that $r\_2 > r\_1$; then R returns (r',v') where $r' >= r\_1$ (R sees W), wherein v and v' are values and wherein r', $r\_2$ and $r\_1$ are ranks, Non-triviality: If a rr-write operation W invoked with rank $r\_1$ aborts, then there exists a rr-read or rr-write operation with rank $r\_2 > r\_1$ which is invoked before W returns, and Liveness: If an operation rr-read or rr-write is invoked by a non-faulty process, then it eventually returns, wherein increasing versions of values within data objects are stored for ensuring that newer values are never overwritten with older ones.

In an embodiment, the present invention even further relates to a method for providing a Compare-And-Swap, CAS, object for transactional access to shared data within a storage by multiple clients, wherein the storage comprises multiple storage units, each of which being accessible via a separate Application Programming Interface, API, each of which comprising a Compare-And-Swap, CAS, primitive, wherein an entirety of multiple such storage units is assigned one further API comprising a further Compare-And-Swap, CAS, primitive for access by the clients and wherein as the CAS object a CAS object according to claim 15 based on a ranked register according to claim 7 is used, so that the CAS object comprises multiple CAS objects in the form of said multiple storage units with their APIs.

In an embodiment, the present invention even further relates to a Compare-And-Swap, CAS, object for transactional access to shared data within a storage by multiple clients, wherein the storage comprises multiple storage units, each of which being accessible via a separate Application Programming Interface, API, each of which comprising a Compare-And-Swap, CAS, primitive, wherein an entirety of multiple such storage units is assigned one further API comprising a further Compare-And-Swap, CAS, primitive for access by the clients and wherein the CAS object is a CAS object according to claim 15 based on a ranked register according to claim 7, so that the CAS object comprises multiple CAS objects in the form of said multiple storage units with their APIs.

In an embodiment, the present invention even further relates to a method for providing transactional access to shared data within a storage by multiple clients, wherein the storage comprises multiple storage units, each of which being accessible via a separate Application Programming Interface, API, each of which comprising a Compare-And-Swap, CAS, primitive, wherein an entirety of multiple such storage units is assigned one further API comprising a further Compare-And-Swap, CAS, primitive for access by the clients and wherein as a functional connection between the entirety of multiple such storage units and the further API a ranked register is used.

In an embodiment, the present invention provides a method for building a concurrent data structure in the form of a ranked register, an according ranked register, a method for building a CAS object, an according CAS object, a method for providing a CAS object for transactional access to shared data within a storage by multiple clients, an according CAS object for transactional access to shared data within a storage by multiple clients and a method for providing transactional access to shared data within a storage by multiple clients for allowing a very reliable access of shared data within a storage by multiple clients.

According to an embodiment of the invention, the method comprises building of the RR based on a Compare-And-Swap, CAS, functionality for storing increasing versions of values within data objects for ensuring that newer values are never overwritten with older ones.

According to an embodiment of the invention, the concurrent data structure includes the RR based on a Compare-And-Swap, CAS, functionality for storing increasing versions of values within data objects for ensuring that newer values are never overwritten with older ones.

According to an embodiment of the invention, it has been recognized that it is possible to provide a very reliable access of shared data within a storage by multiple clients when using CAS functionality within the construction of a ranked register. Contrary to the situation within [PODC02], the present invention does not require server-side code. In contrast, CAS supports only "update if nothing changed" functionality that tests for equality only. Within the inventive method and ranked register a fault-tolerant ranked register is constructed from fault-prone CAS objects.

Within a preferred embodiment of the invention, each base object or data object holds a read rank, rR, changed only by rr-read, as well as a value, val, and a write rank, wR, changed only by rr-write, wherein the designation CAS_r and CAS_w is used to distinguish CAS invocations by rr-read and rr-write, respectively.

Within a further preferred embodiment of the invention, an rr-read operation R with rank r attempts to change the read rank of a majority of base objects or data objects to r, wherein at the same time, R accumulates the values returned.

Within a further preferred embodiment of the invention, R tries to update a data object only if the current rank rR is lower than r, ensuring that ranks are monotonically increasing.

Within a further preferred embodiment of the invention, once a majority of base objects or data objects hold a rank, either rW or rR, greater or equal to r, R returns the rank-value pair with the highest write rank wR among the values or accumulated values.

Within a further preferred embodiment of the invention, an rr-write operation W with rank-value pair (r, v) attempts to update a majority of data objects with (r, v), wherein W tries to update a data object x only if the current ranks, both rR and wR, of x are not higher than r, wherein if W commits, then it has successfully updated a majority of data objects with (r, v), else, if W is not able to update x and some of the ranks, either rR or wR, is higher than r, then W aborts.

With the method for building a CAS object according to an embodiment of the invention, it is possible to construct an obstruction-free CAS object from a ranked register.

Within a further preferred embodiment of the invention, a client picks a rank r, and first fetches the current value V using rr-read(r); next, it checks if V.val equals an expected value exp, and if yes, it attempts to update V with (r, new) using rr-write, else, if V.val differs from exp, the client attempts to update V with (r, v), i.e. only the rank is changed.

Within a further preferred embodiment of the invention, if the operation aborts, the steps are repeated with a higher rank.

Within a further preferred embodiment of the invention, the operation returns when rr-write commits.

Within a further preferred embodiment of the invention, for increasing the chances of solo-runs of clients, a concurrency management is used.

Within a further preferred embodiment of the invention, the concurrency management comprises exponential back-off or leader election, where all clients throw their CAS operations into a global set, and a particular client, i.e. the leader, linearizes all operations in the set.

Within a further preferred embodiment of the invention, an extended CAS object is implemented, that aborts whenever the underlying rr-write operation aborts, wherein contention resolution would then be handled by an invoking application.

Within a further preferred embodiment of the invention, a method provides a CAS object for transactional access to shared data within a storage by multiple clients. The CAS object is based on a ranked register according to claim 7. As a result, the crash-tolerant CAS object is provided from a set of crash-prone CAS objects in the form of the storage units while supporting an unbounded number of crash-prone clients with constant space.

Within a further preferred embodiment of the invention, a method provides transactional access to shared data within a storage by multiple clients. Under consideration of a storage with multiple storage units a Compare-And-Swap API is build on top of an entirety of at least some of said storage units.

Within a further preferred embodiment of the invention, the ranked register is a ranked register according to an embodiment of the invention.

Within a further preferred embodiment of the invention, the storage units can be storage clouds or storage servers which can be provided within a data center.

On the basis of the present invention ranked registers can be leveraged in the construction of fault-tolerant CAS objects from fault-prone CAS objects. Further, a fault-tolerant ranked register can be constructed from fault-prone CAS objects. Moreover, a CAS object can be constructed from a ranked register.

Important aspects of the invention together with embodiments are summarized as follows:
1) Robust transactional access to shared data via fault-tolerant CAS objects.
2) Our solution does not require deploying and running any server code.
3) Our construction of CAS from a set of fault-prone CAS is:
   a. Space efficient
   b. Non-blocking (i.e. obstruction-free)
   c. Optimally resilient
   d. Exhibits low-latency in contention-free runs.

The present invention builds entirely on the specification of CAS and does not require running customized server-side code as in [PODC02]. Our method leverages existing APIs without requiring any change in the server.

According to embodiments of the present invention, a method and a system for transactional data-sharing in a multi-cloud or multi-storage setting can be provided. Embodiments of the present invention leverage the Compare-And-Swap API provided by existing data-serving platforms such as Yahoo! PNUTS, Amazon DynamoDB, Couchbase etc. to build a Compare-And-Swap API on top of multiple such storage clouds. The present construction tolerates the crash of up to a minority of storage clouds, i.e. optimal resilience, and supports arbitrary many clients with constant space. Unlike [PODC02], the present solution does not require server-side code.

Embodiments of the present invention describe a method and system of implementing a crash-tolerant CAS object from a set of crash-prone CAS objects while supporting an unbounded number of crash-prone clients with constant space. Specifically, for each high-level CAS object—client view—, a single low-level CAS object is required per server, see FIG. 1. Concretely, each CAS object like for example DynamoDB, Couchbase or MongoDB comprises the objects $x_1, x_2, \ldots$ which are accessible for the clients from their CAS API from above within FIG. 1. The software for using the access functionality could only be provided at the client. Such a software can contact all single clouds or storages.

The present invention is related to Active Disk Paxos [PODC02], which introduces the abstraction of the Ranked Register, RR, to capture the safety property of Consensus— safety here means decision on a single value. The authors of [PODC02] present a crash-tolerant construction of a RR from a set of crash-prone Read-Modify-Write, RMW, objects. Unlike CAS, that is a generic, reusable functionality readily available in cloud data stores, e.g. DynamoDB, Couchbase, MongoDB etc., a RMW object requires customized server-side code, which is quite different from our setting, see FIG. 1, in which individual storages have a well-defined API.

A correct construction of a RR requires that servers store monotonically increasing versions, which ensures that newer values are never overwritten with older ones. This property is enforced in [PODC02] by specialized RMW functionality executed in the server that compares versions to determine the highest one. In contrast, CAS supports only "update if nothing changed" functionality that tests for equality only, turning the construction of a RR into a challenging task.

Figure 2:
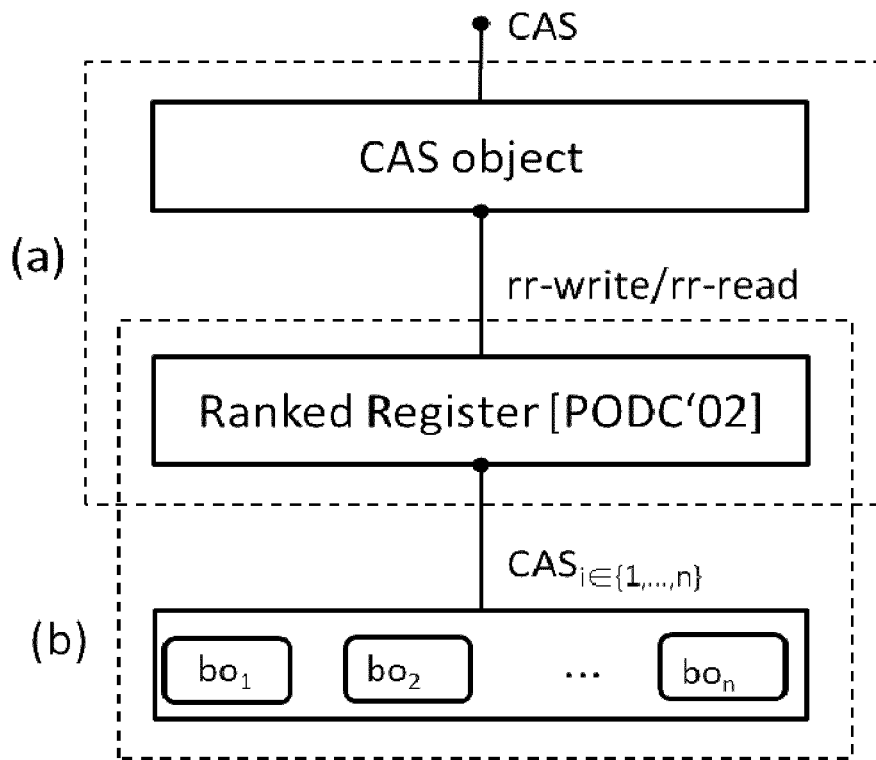
FIG. 2 illustrates architectural building blocks and representation of their constructions (a) and (b), according to an embodiment.

In embodiments of the present invention, a two-step approach is taken, see FIG. 2 (a)+(b) for an overview:
(a) Illustrated an obstruction-free construction of a CAS object from a RR.
(b) Illustrated a wait-free construction of a fault-tolerant RR from a set of fault-prone CAS objects, illustrated in FIG. 3.

Together (a)+(b) yield the first obstruction-free construction of CAS from a set of crash-prone or fault-prone CASs.

It is important to note that the results (a) and (b) are interesting in their own right. For instance, in combination with [PODC02], the result (b) yields fault-tolerant constructions of arbitrary atomic objects.

From [PODC02] is obtainable a detailed description of a construction of a ranked register. This explanation and further details and facts which are important for the present invention are explicitly included in this application by reference. In the following a summary of a ranked register and CAS functionality is provided.

Ranked Register, RR:

A ranked register is a concurrent data structure with two methods rr-read and rr-write. The rr-read method takes a rank, i.e. monotonically increasing timestamp, as argument and returns a rank-value pair. The rr-write method takes a rank-value pair as argument and returns either commit or abort. A ranked register needs to satisfy the following specification as defined in [PODC02]:

Safety: Every rr-read operation returns a rank-value pair that was written in some rr-write invocation. Additionally, let W=rr-write($r\_1$, v) be a rr-write operation that commits and let R=rr-read($r\_2$), such that $r\_2 > r\_1$. Then R returns (r',v') where $r' \geq r\_1$ (R sees W).

Intuitively, safety demands that a rr-read operation doesn't miss any rr-write with a lower rank than itself.

Non-triviality: If a rr-write operation W invoked with rank $r\_1$ aborts, then there exists a rr-read or rr-write operation with rank $r\_2 > r\_1$ which is invoked before W returns.

Intuitively, non-triviality stipulates that rr-write operations are allowed to abort only because of concurrency. Note that the spec does not rule out that crashed clients cause aborts, but any sensible implementation needs to prevent such a scenario.

Liveness: If an operation rr-read or rr-write is invoked by a non-faulty process, then it eventually returns.

This is the definition of wait-freedom, the strongest possible liveness property.

Compare-And-Swap, CAS

DEFINITION

Compare-and-swap Sequential Specification.

A compare-and-swap object C supports a single operation called CAS and stores a scalar value over some domain V. The operation CAS(exp,new), for exp, new∈V, induces the following state transition of the compare-and-swap object. If C's value is exp, C's value is changed to new; otherwise, C's value remains unchanged. In any case, the operation returns C's old value.

Construction of CAS Object from a Single Ranked Register:

The idea is illustrated in FIG. 3, left. V is a tuple: V=(rank, val). A client picks a rank r, and first fetches the current value V using rr-read(r). Next, it checks if V.val equals the expected value exp, and if yes, it attempts to update V with (r, new) using rr-write. Else, if V.val differs from exp, the client attempts to update V with (r, v), i.e. only the rank is changed. If the operation aborts, the steps are repeated with a higher rank. The operation returns when rr-write commits. The construction is obstruction-free, i.e. termination is guaranteed when the client invoking CAS eventually runs solo. To increase the chances of solo-runs, exponential back-off is used.

A viable alternative to exponential back-off is leader election, where all clients throw their CAS operations into a global set, and a particular client, i.e. the leader, linearizes all operations in the set. Another alternative is to implement an extended CAS object that aborts whenever the underlying rr-write operation aborts. Contention resolution would then be handled by the invoking application.

The construction in FIG. 3 is correct to the extent that it is atomic and that it satisfies the sequential specification of CAS, Definition. Furthermore, it is obstruction-free.

If the code is run sequentially, it is easy to see that our construction is obstruction-free and that it abides the sequential specification of CAS, Definition. Now, assume that two clients $c\_i$ and $c\_j$ run concurrently, and that both return, committing with rank $r\_i$ and $r\_j$ respectively. Let CAS_i and CAS_j be the instances invoked by $c\_i$ and $c\_j$ respectively. It can be shown that if $r\_i < r\_j$ then the execution is equivalent to a sequential execution in which CAS_i is sequenced before CAS_j, where i,j∈{1,2} and i≠j. Without loss of generality, let i=1 and j=2.

Since c_1 commits with r_1 and $r\_1 < r\_2$, by the Safety property of the ranked register, when c_2 invokes rr-read (r_2), it sees the change committed by c_1. Therefore, c_2 does the comparison based on the state left by c_1. Thus, this is equivalent to a sequential permutation in which CAS_1 is sequenced before CAS_2.

Furthermore, if a client eventually runs solo, then it picks a rank which is higher than any other rank used so far, in which case the rr-write operation commits and the client returns from the CAS invocation.

Finally, the READ operation on the right side of FIG. 3 is added for completeness, since CAS is typically used as part of a first-read-then-write pattern. Since CAS is executed with equal parameters, here the initial value, nothing is changed.

Construction of a Fault-Tolerant Ranked Register from Fault-Prone CAS Objects:

The idea is illustrated in FIG. 4. Each base object holds a read rank (rR), changed only by rr-read, as well as a value (val) and write rank (wR), changed only by rr-write. CAS_r/CAS_w are used to distinguish CAS invocations by rr-read/rr-write respectively.

An rr-read operation R with rank r attempts to change the read rank of a majority of base objects to r. At the same time, R accumulates the values returned. R tries to update an object only if the current rank rR is lower than r, ensuring that ranks are monotonically increasing. Once a majority of base objects hold a rank, either rW or rR, greater or equal to r, R returns the rank-value pair with the highest write rank wR among the accumulated values.

An rr-write operation W with rank-value pair (r,v) attempts to update a majority of objects with (r,v). W tries to update an object x only if the current ranks, both rR and wR, of x are not higher than r. If W commits, then it has successfully updated a majority of objects with (r,v). Else, if W is not able to update x and some of the ranks, either rR or wR, is higher than r, then W aborts.

The construction in FIG. 4 is correct:
1) Non-triviality holds because an rr-write operation aborts only if it sees a higher-ranked operation in one of the base objects it accesses.
2) Liveness is satisfied because each operation op=rr-read(r)/rr-write((r,v)) eventually returns. The explanation is that for any rank r, there are only a finite number of operations that are invoked with a lower rank, and thus op re-invokes CAS on a base object x only a finite number of times. Eventually, either x is successfully updated by op or x holds a rank higher than r. In any case, op does not block on x.
3) Safety: Let W=rr-write(r_1, v) be a rr-write operation that commits and let
R=rr-read(r_2), such that r_2>r_1. It can be argued that R returns (r',v') where r'>=r_1, thus satisfying Safety. Let O_w and O_r be the sets of based objects accessed by W and R respectively. Let k∈O_w∩O_r. Let CAS_r and CAS_w be the last operation on x_k by R and W respectively. If CAS_r is sequenced before CAS_w, then CAS_w returns a rank higher than r_1 (at least r_2). Since CAS_w is invoked with rank at most r_1, the value returned by CAS_w does not match the expected value and W would abort, contradicting our assumption. Otherwise, if CAS_w is sequenced before CAS_r, CAS_r would assign to x[k] a value with rank r_1 or higher and consequently R would return a rank-value pair with rank r'>=r_1, as needed.

Intra-Datacenter Coordination:

In addition to the multi-cloud setting, our method is useful in a single datacenter setting with multiple storage units as well. For instance, it enables building data-centric coordination on top of fault-prone storage servers within a data center. Since all our solution needs is a generic CAS interface, full customization of the controller logic as in [PODC02] is not required and the interface can be reused by several applications.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for building a concurrent data structure in a form of a ranked register, RR,
   wherein rr-read and rr-write operations are defined within the RR,
   each of the rr-read operations takes a rank as argument and returns a rank-value pair,
   each of the rr-write operations takes a rank-value pair as argument and returns either commit or abort,
   each of the rr-read operations returns a rank-value pair that was written in a previous rr-write operation,
   one of the rr-write operations W=rr-write(r_1, v) commits and one of the rr-read operations R=rr-read(r_2), such that r_2>r_1,
   R returns (r',v'), wherein r'>=r_1, wherein v and v' are values, and wherein r', r_2 and r_1 are ranks,
   based on a rr-write operation W invoked with rank r_1 aborting, invoking one of the rr-read or rr-write operations with rank r_2>r_1 before W returns,
   based on one of the rr-read or rr-write operations being invoked by a non-faulty process, eventually returning the one of the rr-read or rr-write operations invoked by the non-faulty process, and
   wherein the building of the RR is based on a Compare-And-Swap, CAS, functionality so as to store increasing versions of values within data objects and to ensure that newer values are never overwritten with older ones.

2. The method according to claim 1, wherein each base object or data object holds a read rank, rR, changed only by one of the rr-read operations, and holds a value, val, and a write rank, wR, changed only by one of the rr-write operations, wherein designations CAS_r and CAS_w designates CAS invocations by rr-read and rr-write operations, respectively.

3. The method according to claim 2, wherein R with rank r attempts to change the read rank of a majority of base objects or data objects to r, while R accumulates the values returned.

4. The method according to claim 3, wherein R tries to update a data object only if a current read rank rR is lower than r, ensuring that ranks are monotonically increasing.

5. The method according to claim 4, wherein, once a majority of base objects or data objects hold a rank, either rW or rR, greater or equal to r, R returns the rank-value pair with the highest write rank wR among the values or accumulated values.

6. The method according to claim 5, wherein W with rank-value pair (r, v) attempts to update a majority of data objects with (r, v), wherein W tries to update a data object x only if the current ranks, both rR and wR, of x are not higher than r, wherein if W commits, then it has successfully updated a majority of data objects with (r, v), else, if W is not able to update x and some of the ranks, either rR or wR, is higher than r, then W aborts.

7. A concurrent data structure in comprising a form of a ranked register, RR,
wherein rr-read and rr-write operations are defined within the RR,
each of the rr-write operations takes a rank-value pair as argument and returns either commit or abort,
each of the rr-read operations returns a rank-value pair that was written in a previous rr-write operation,
one of the rr-write operations W=rr-write($r\_1$, v) commits and one of the rr-read operations R=rr-read($r\_2$), such that $r\_2 > r\_1$,
R returns (r',v'), wherein $r' \geq r\_1$, wherein v and v' are values, and wherein r, $r\_2$ and $r\_1$ are ranks,
based on the rr-write operation W invoked with rank $r\_1$ aborting, invoking one of the rr-read or rr-write operations with rank $r\_2 > r\_1$ before W returns, and
based on one of the rr-read or rr-write operations being invoked by a non-faulty process, eventually returning the one of the rr-read or rr-write operations invoked by the non-faulty process,
wherein the RR is built based on a Compare-And-Swap, CAS, functionality so as to store increasing versions of values within data objects and to ensure that newer values are never overwritten with older ones.

8. A method for building a Compare-And-Swap, CAS, object, comprising:
using a concurrent data structure in a form of a ranked register, RR,
wherein rr-read and rr-write operations are defined within the RR,
each of the rr-read operations takes a rank as argument and returns a rank-value pair,
each of the rr-write operations takes a rank-value pair as argument and returns either commit or abort,
each of the rr-read operations returns a rank-value pair that was written in a previous rr-write operation,
one of the rr-write operations W=rr-write($r\_1$, v) commits and one of the rr-read operations R=rr-read($r\_2$), such that $r\_2 > r\_1$,
R returns (r',v'), wherein $r' \geq r\_1$, wherein v and v' are values, and wherein r', $r\_2$ and $r\_1$ are ranks,
based on the rr-write operation W invoked with rank $r\_1$ aborting, invoking one of the rr-read or rr-write operations with rank $r\_2 > r\_1$ before W returns, and
based on one of the rr-read or rr-write operations being invoked by a non-faulty process, eventually returning the one of the rr-read or rr-write operations invoked by the non-faulty process, and
wherein increasing versions of values within data objects are stored for ensuring that newer values are never overwritten with older ones.

9. The method according to claim 8, further comprising:
picking, by a client, a rank r,
fetching a current value V using rr-read(r), then
checking if the current value V equals an expected value exp,
if the current value V equals exp, attempting to update V with (r, new) using one of the rr-write operations, and
if the current value V differs from exp, attempting to update V with (r, v), to change only the rank.

10. The method according to claim 9, further comprising:
based on the operation aborting, picking, by the client, a higher rank r,
fetching the current value V using rr-read(r),
checking if the current value V equals an expected value exp,
if the current value V equals exp, attempting to update V with (r, new) using one of the rr-write operations, and
if the current value V differs from exp, attempting to update V with (r, v), to change only the rank.

11. The method according to claim 9, wherein the operation returns when rr-write commits.

12. The method according to claim 8, wherein, for increasing chances of solo-runs of clients, a concurrency management is used.

13. The method according to claim 12, wherein the concurrency management comprises exponential back-off or leader election, where all clients throw their CAS operations into a global set, and a specific client, acting as a leader, linearizes all operations in the set.

14. The method according to claim 8, wherein an extended CAS object is implemented, that aborts whenever the underlying rr-write operation aborts, wherein contention resolution is then handled by an invoking application.

15. A Compare-And-Swap, CAS, object, built by the method according to claim 8, based on a concurrent data structure in the form of a ranked register, RR,
wherein rr-read and rr-write operations are defined within the RR,
each of the rr-read operations takes a rank as argument and returns a rank-value pair,
each of the rr-write operations takes a rank-value pair as argument and returns either commit or abort,
each of the rr-read operations returns a rank-value pair that was written in a previous rr-write operation,
one of the rr-write operations W=rr-write($r\_1$, v) commits and one of the rr-read operations R=rr-read($r\_2$), such that $r\_2 > r\_1$,
R returns (r',v'), wherein $r' \geq r\_1$, wherein v and v' are values, and wherein r', $r\_2$ and $r\_1$ are ranks,
based on the rr-write operation W invoked with rank $r\_1$ aborting, invoking one of the rr-read or rr-write operations with rank $r\_2 > r\_1$ before W returns, and
based on one of the rr-read or rr-write operations being invoked by a non-faulty process, eventually returning the one of the rr-read or rr-write operations invoked by the non-faulty process, and
wherein increasing versions of values within data objects are stored for ensuring that newer values are never overwritten with older ones.

16. A method for providing a Compare-And-Swap, CAS, object for transactional access to shared data within a storage by a plurality of clients,
wherein the storage comprises a plurality of storage units, each of the storage units being accessible via a separate Application Programming Interface, API, each of which comprise a Compare-And-Swap, CAS, primitive, the method comprising:

assigning an entirety of the storage units one further API comprising a further Compare-And-Swap, CAS, primitive for access by the clients, and using as the CAS object a CAS object according to claim 15 based on a ranked register, RR, such that the CAS object comprises a plurality of CAS objects in the form of the storage units with their APIs.

17. A Compare-And-Swap, CAS, object for transactional access to shared data within a storage by a plurality of clients, wherein the storage comprises a plurality of storage units, each of the storage units being accessible via a separate Application Programming Interface, API, each of which comprise a Compare-And-Swap, CAS, primitive, wherein an entirety of the storage units is assigned one further API comprising a further Compare-And-Swap, CAS, primitive for access by the clients, and wherein the CAS object is a CAS object according to claim 15 based on a ranked register, RR, such that the CAS object comprises a plurality of CAS objects in a form of the storage units with their APIs.

18. A method for providing transactional access to shared data within a storage by a plurality of clients, wherein the storage comprises a plurality of storage units, each of the storage units being accessible via a separate Application Programming Interface, API, each of which comprising a Compare-And-Swap, CAS, primitive, the method comprising:

assigning an entirety of the storage units one further API comprising a further Compare-And-Swap, CAS, primitive for access by the clients, and using a ranked register, RR as a functional connection between the entirety of the storage units and the further API, wherein the RR is built based on a Compare-And-Swap, CAS, functionality so as to store increasing versions of values within data objects and to ensure that newer values are never overwritten with older ones.

19. The method according to claim 16, wherein the storage units are storage clouds or storage servers.

* * * * *